(12) United States Patent
Kakivaya et al.

(10) Patent No.: US 8,275,912 B2
(45) Date of Patent: Sep. 25, 2012

(54) BOOTSTRAP RENDEZVOUS FEDERATION

(75) Inventors: Gopala Krishna Reddy Kakivaya, Sammamish, WA (US); Lu Xun, Kirkland, WA (US); Rishi Rakesh Sinha, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 309 days.

(21) Appl. No.: 12/430,254

(22) Filed: Apr. 27, 2009

(65) Prior Publication Data
US 2010/0106831 A1 Apr. 29, 2010

Related U.S. Application Data

(60) Provisional application No. 61/108,099, filed on Oct. 24, 2008.

(51) Int. Cl.
*G06F 15/16* (2006.01)
(52) U.S. Cl. ......... 709/251; 709/201; 709/204; 709/222
(58) Field of Classification Search .................. 709/251, 709/201, 204, 222
See application file for complete search history.

(56) References Cited

U.S. PATENT DOCUMENTS

| 7,065,579 B2 | 6/2006 | Traversat et al. |
| 2002/0184357 A1 | 12/2002 | Traversat et al. |
| 2003/0055892 A1 | 3/2003 | Huitema et al. |
| 2003/0177376 A1* | 9/2003 | Arce Velleggia et al. ...... 713/189 |
| 2005/0094620 A1 | 5/2005 | Calcev |
| 2006/0282505 A1* | 12/2006 | Hasha et al. .................. 709/207 |
| 2007/0002774 A1 | 1/2007 | Hasha et al. |
| 2008/0071878 A1* | 3/2008 | Reuter .......................... 709/208 |
| 2008/0250124 A1 | 10/2008 | Rentschler et al. |
| 2008/0288646 A1* | 11/2008 | Hasha et al. .................. 709/228 |
| 2009/0158394 A1* | 6/2009 | Oh et al. ............................. 726/3 |
| 2009/0313353 A1* | 12/2009 | Lou ................ 709/219 |

FOREIGN PATENT DOCUMENTS
WO 2008060938 A2 5/2008

OTHER PUBLICATIONS

Castro, et al. Performance and Dependability of Structured Peer-to-Peer Overlays. http://research.microsoft.com/~antr/MS/dsn2004.pdf. Last accessed Nov. 11, 2008.

Ding. Bootstrapping Chord over MANETs—All Roads Lead to Rome. http://laptops.maine.edu/WeiDingPaper.pdf. Last accessed Nov. 11, 2008.

(Continued)

*Primary Examiner* — Larry Donaghue
*Assistant Examiner* — Nicholas Taylor
(74) *Attorney, Agent, or Firm* — Chin IP, PLLC; Davin Chin

(57) ABSTRACT

Systems and methods that ensure formation of a single ring from a seed node at any given time. A "bootstrap" phase is included in a node's life cycle, to mitigate adverse affects of split-brain conditions in a network. During such bootstrap phase, if an existing ring is found, the seed node can join the existing ring in a same manner as a non-seed node does. If no ring is detected, the bootstrap phase attempts to elect a seed node to be the "super-seed node", wherein a new ring can then be formed with such new super-seed node as the first node.

20 Claims, 11 Drawing Sheets

OTHER PUBLICATIONS

International search report and written opinion mailed May 18, 2010, for PCT Application Serial No. PCT/US2009/060972, 11 pages.

Extended European Search Report dated Apr. 20, 2012, for European Patent Application No. 09822479.3, 9 pages.

Lamport; "Paxos Made Simple"; Retrieved from <<http://research.microsoft.com/users/lamport/pubs/paxos-simple.pdf>>; Nov. 1, 2001; 14 pages.

* cited by examiner

BOOTSTRAP RENDEZVOUS FEDERATION

CROSS REFERENCE TO RELATED APPLICATIONS

This application claims the benefit of U.S. Provisional Application No. 61/108,099 filed on 24 Oct. 2008 entitled "BOOTSTRAP RENDEZVOUS FEDERATION" the entirety of this application is hereby incorporated by reference. This non-provisional application further relates to U.S. patent application Ser. No. 12/038,363 filed on 27 Feb. 2008, entitled "NEIGHBORHOOD MAINTENANCE IN THE FEDERATION" and U.S. patent application Ser. No. 12/020,074 filed on 25 Jan. 2008, entitled "ROUTING TOKEN TRANSFER & RECOVERY PROTOCOL IN RENDEZVOUS FEDERATION"; all of the aforementioned patent applications are incorporated herein by reference in their entireties.

BACKGROUND

Advances in computer technology (e.g., microprocessor speed, memory capacity, data transfer bandwidth, software functionality, and the like) have generally contributed to increased computer application in various industries. Ever more powerful server systems, which are often configured as an array of servers, are commonly provided to service requests originating from external sources such as the World Wide Web, for example.

As the amount of available electronic data grows, it becomes more important to store such data in a manageable manner that facilitates user friendly and quick data searches and retrieval. Today, a common approach is to store electronic data in one or more databases. A typical database can be referred to as an organized collection of information with data structured such that a computer program can quickly search and select desired pieces of data, for example.

Moreover, in such environments a federation refers to a group of organizations or service providers that have built trust among each other and enable sharing of user identity information amongst themselves. For example, federated identity is a distributed computing construct that recognizes that individuals move between corporate boundaries at an increasingly frequent rate. Practical applications of federated identities are represented by large multinational companies that are required to manage several heterogeneous systems at the same time.

In general, problems can frequently arise when a first node (e.g., a super seed node) that originates the federation or ring can inadvertently create multiple rings when in fact a single ring was originally desired. Moreover, further complexities can arise in split-brain situations, wherein two rings exist at the same time without knowing each other. Such can further create difficulties when an underlying communication channel is not deemed reliable, and can contribute to partitions in the network, for example. In addition, conventional systems employ a manual process that typically requires an administrator to initially ensure there is no existing node, and then explicitly instruct a seed node to act as the super seed node.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

The subject innovation enforces predetermined conditions for quorums of seed nodes in a distributed environment—via a ring formation component, to ensure that exactly one single ring—associated with a set of nodes—can be formed at any given time from a seed node. Such ring formation component instigates conditions as a "bootstrap" phase in a life cycle of a node, to mitigate adverse affects of split-brain scenarios (e.g., when two rings are formed simultaneously without knowledge of each other in a network.) The set of nodes can be associated with a predetermined application, and/or defined by a user, for example. During the bootstrap phase, if an existing ring is found, the seed node can join the existing ring in a same manner as a non-seed node does. Yet, if no ring is detected, the bootstrap phase attempts to elect a seed node as the "super-seed node" that can form a new ring, wherein, such new super-seed node represents the first node of the new ring. As such, a super seed node represents a seed node with an authority to start a new ring.

According to a particular aspect, the ring formation component ensures creation and/or presence of a single ring, by enforcing the following conditions; namely; 1) during the bootstrap phase exactly one seed node is selected to be the super-seed node; 2) a super-seed node is elected by a quorum of seed nodes; and 3) a super-seed node can form a new ring only after it ensures that the global tickets from all the seed nodes in the quorum have expired. In addition, the subject innovation further establishes global leases between a node and a group of designated seed nodes—wherein a node can live if it has active lease with a quorum of the seed nodes.

In a related aspect, the seed nodes can communicate among themselves to elect the first node that forms such ring. Accordingly, existence of a ring can depend on global leases associated therewith. In one aspect, a seed node can generate two type of tickets; namely a global ticket and a super ticket, which are subject to the following constraints: 1. time-to-live (TTL) requirements, wherein an associated TTL exists and expires after a predetermined period; 2) behavioral requirements, wherein behaviors can be guaranteed from the recipient node and the originating seed node (the type of behavior is determined by the type of ticket; 3) transfer requirements, wherein tickets can be passed from one node to another; 4) restoration requirements, wherein every ticket needs to be persisted before it is issued out—so that it can survive reboots of the node (e.g., issuing a ticket signifies that the issuing node is promising to take certain responsibility, and hence it must typically remember what promises it has offered); 5) requirements for order of expiration; wherein the ticket expires on the issuing node after it expires on the recipient node.

According to a further aspect, a global ticket represents the following conditions by an issuing seed node to a recipient node, namely: 1) a seed node does not attempt to form a new ring unless certain that there cannot exist a quorum of unique global tickets in the federation; and 2) upon losing a quorum of global tickets a node terminates itself and rejoins the ring. Likewise, super tickets are issued from seed nodes to seed nodes and only during the "bootstrap phase"—when a new ring is being created. During such bootstrap phase, a node is typically only allowed to issue global tickets for the nodes whose super ticket it holds. As such, upon transfer of a super ticket associated therewith, a node relinquished its authority to issue global tickets.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
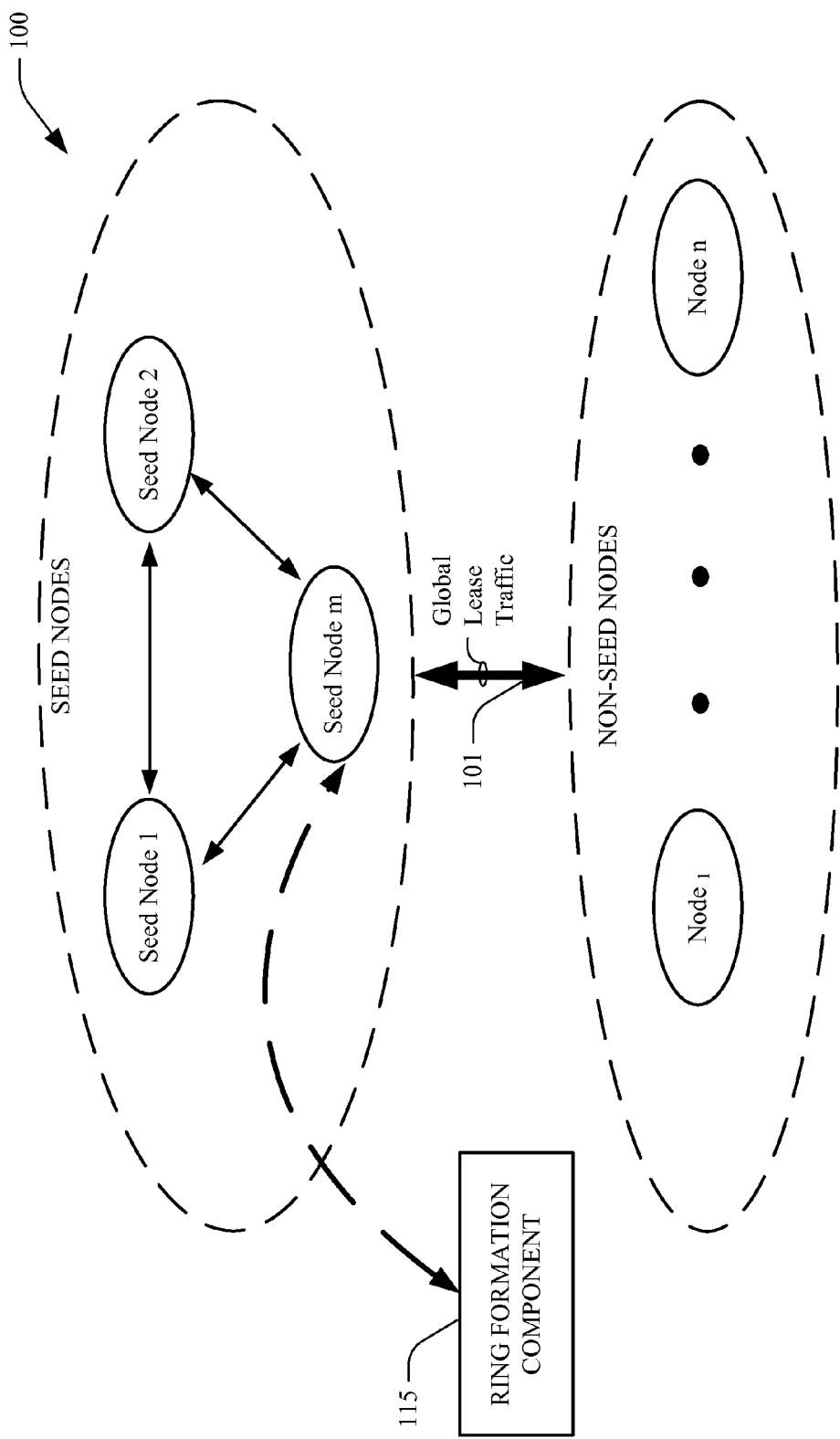
FIG. 1 illustrates a block diagram of a system with a plurality of seed/non-seed nodes for a federation in accordance with an aspect of the subject innovation.

FIG. 1 illustrates a block diagram for a system 100 that employs a ring formation component 115 to ensure that at any given time exactly one single ring can be formed from a seed node associated therewith. In general, such ring further represent a federation consisting of a set of nodes that cooperate among themselves to form a dynamic and scalable network, wherein information can be systematically and efficiently disseminated and located.

For example, the nodes participating in the federation can include a sorted list using a binary relation that is reflexive, anti-symmetric, transitive, total, and defined over the domain of node identities. For instance, both ends of the sorted list can be joined, thereby forming the ring itself. Such provides for each node in the list to view itself as being at the middle of the sorted list. As another example, the list can be doubly linked such that a node can traverse the list in either direction. Moreover, a one-to-one mapping function can be defined from the value domain of the node identities to the nodes themselves. Such mapping function accounts for the sparseness of the nodes in the value domain when the mapping is not tight.

In another example, every node participating in the federation can be assigned a natural number that is between 0 and an appropriately chosen upper bound, inclusive, wherein such range does not have to be consecutive—e.g., there can exist gaps between numbers assigned to nodes. Such number assigned to a node further acts as its identity in the ring. Moreover, the mapping function accounts for gaps in the number space by mapping a number being positioned in between two node identities to the node having an identity that is numerically closest to the number. Accordingly, by assigning each node a uniformly distributed number, it can be ensured that all segments of the ring are uniformly populated. In addition, nodes that indicate the successor, predecessor, and neighborhood computations can be performed efficiently using modulo arithmetic.

The system 100 further enables implementation of leases between all nodes (1 to n, n being an integer) and the seed nodes, represented by the global lease 101. As such, the subject innovation requires that every node in the federation maintain lease with every seed node, wherein the federation has a well-known set of seed nodes (1 to m, m being an integer). The maximum duration of a global lease can further be specified by the global lease timeout period G (e.g., a predetermined time duration.)

In a related aspect, as soon as a node is left with less than a quorum of global leases it must typically terminate (e.g., kill itself) and attempt to rejoin the ring again. Such typically ensures that once a quorum of seed nodes terminate, the ring can subsequently terminate within an interval of G. Accordingly, if a quorum of seed nodes decide to form a new ring, such can be accomplished after period G expires—while ensuring that all the nodes in the previous ring have left. Such quorum of seed nodes can then elect one seed node as the super seed and form the ring safely.

Figure 2:
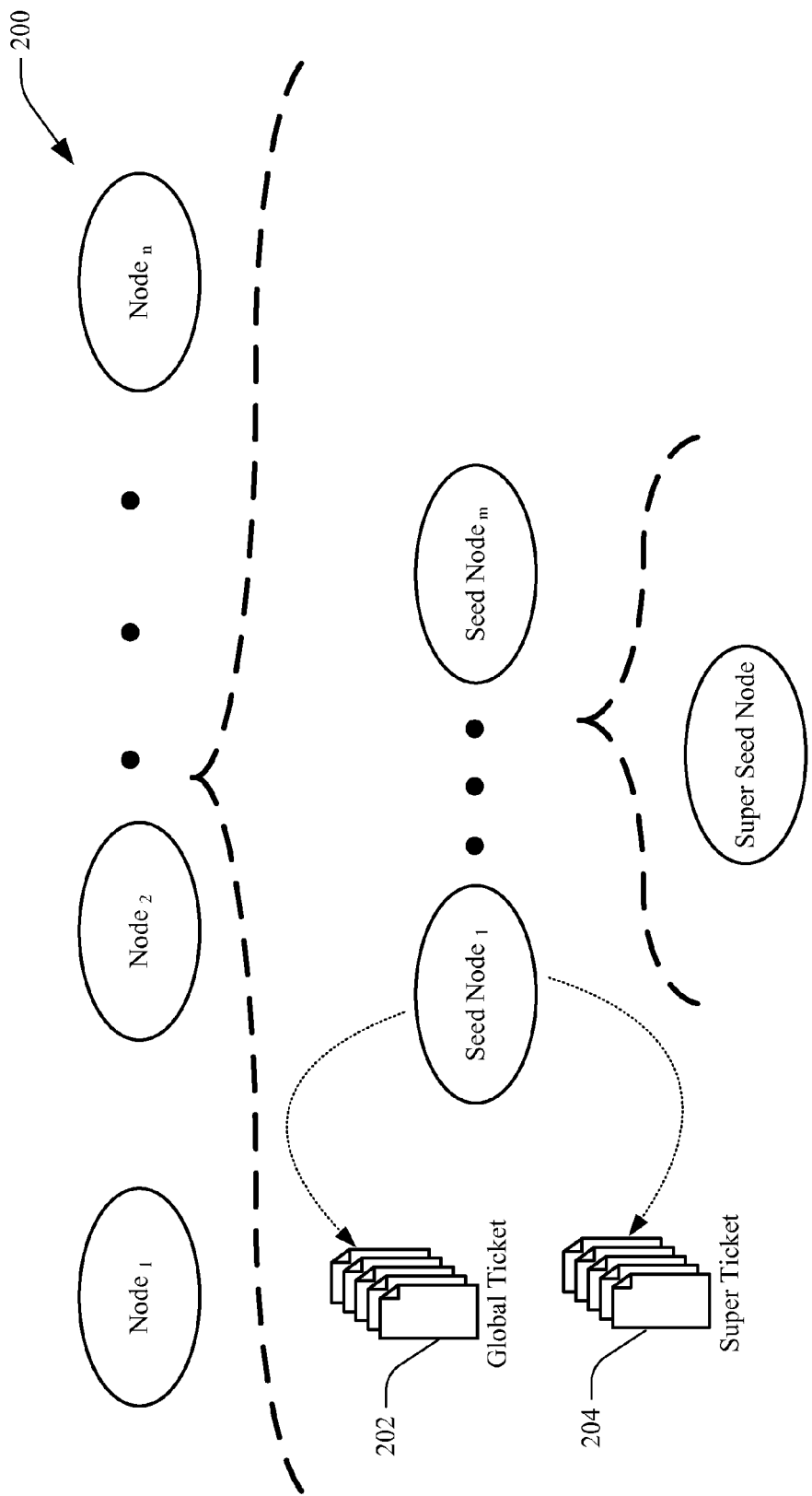
FIG. 2 illustrates a block diagram of a system that employs tickets in conjunction with a plurality of nodes in accordance with an aspect of the subject innovation.

FIG. 2 illustrates an exemplary system 200 according to a further aspect of the subject innovation. As illustrated, two types of timed tickets can be issued by each seed node: the global ticket 202 and the super ticket 204. In general, each ticket complies with the following constraints, namely; 1) an associated TTL, after which it expires; 2) guarantee of behavior from the recipient node and the originating seed node, wherein the type of behavior is determined by the type of ticket; 3) tickets can be passed from one node to another; 4) every ticket is required to be persisted before it is issued out, so that it can survive reboots of the node (e.g., an issuing a ticket can indicate that the issuing node is promising to take certain responsibility and therefore it must remember what promises it has given); and 5) The ticket should expire on the issuing node AFTER it expires on the recipient node.

Moreover, and as illustrated in FIG. 2 the seed nodes can issue two types of tickets:

1. Global Tickets: Every seed node issues global tickets to all nodes in the federation. There exists two guarantees that need to be associated with global tickets.
    a) A seed node will not try to form a new ring unless it is certain that there cannot exist a quorum of unique global tickets in the federation.
    b) A node will terminate or kill itself and rejoin the ring on losing a quorum of global tickets.
2. Super Tickets: Such tickets are issued from seed nodes to seed nodes and only during the bootstrap phase (as described in detail infra) when a new ring is being created. During the bootstrap phase a node is only allowed to issue global tickets for the nodes whose super ticket it holds. On passing its super ticket a node loses its authority to issue global tickets.

Figure 3:
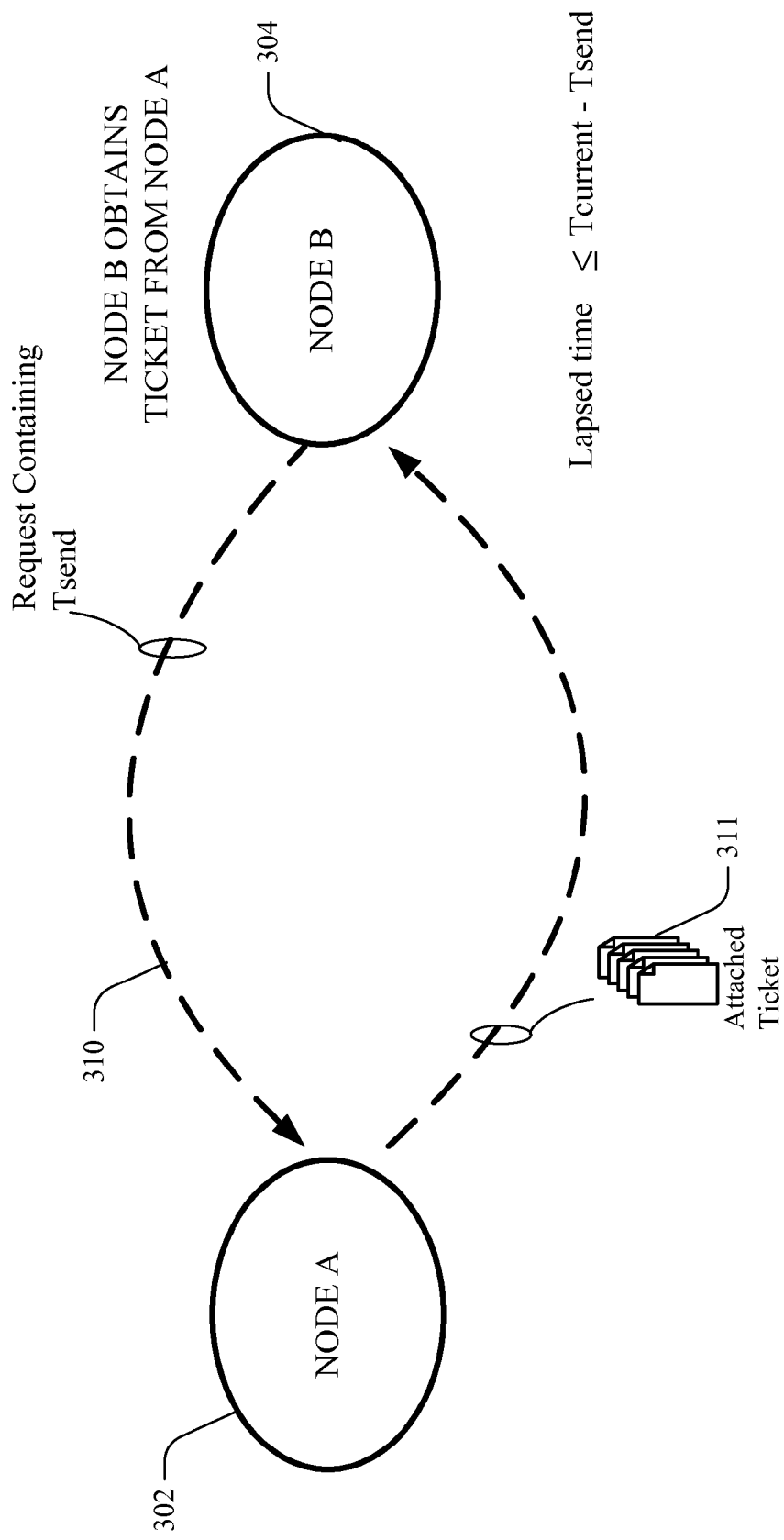
FIG. 3 illustrates an exchange of tickets between nodes according to an aspect of the subject innovation.

FIG. 3 illustrates a particular exchange of tickets between node A 302 and node B 304 according to one particular aspect of the subject innovation. To ensure meeting the constraint of expiring on the issuing node after expiring on the recipient node, one can send the tickets through response messages. For example, FIG. 3 assumes that node B desires to obtain a ticket from node A. Initially and at 310, node B can send a request message to node A that contains $T_{send}$, which represents, the time the message was sent on node B's clock. Node A attaches the ticket 311 in the response message to B along with $T_{send}$. When node B receives the ticket 311, it reduces the time in the ticket by $T_{current}-T_{send}$. Because the time lapsed since the ticket issue is bound by $T_{current}-T_{send}$, such can ensure that the ticket can expire on B before it expires on A.

Figure 4:
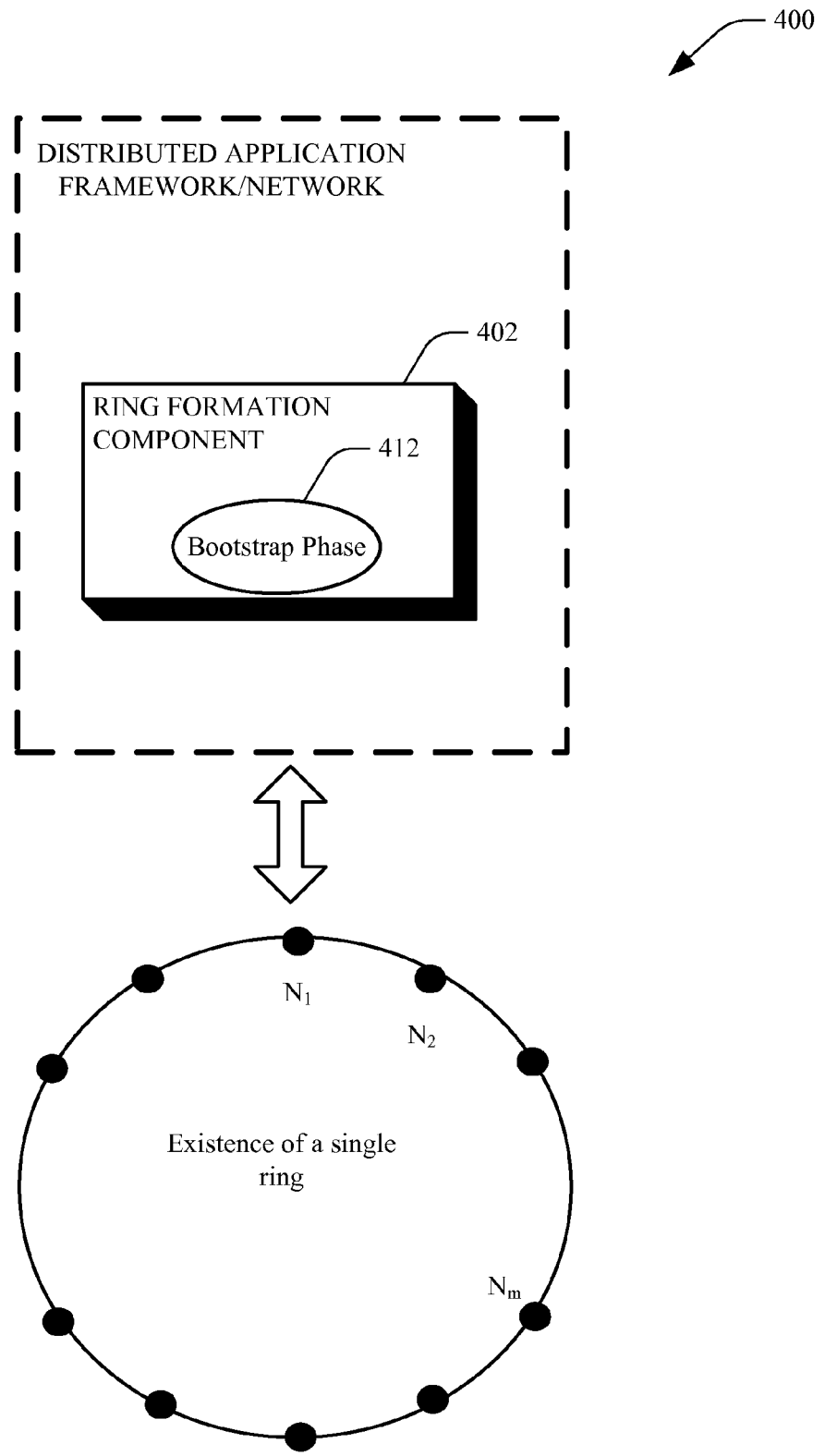
FIG. 4 illustrates a ring formation component that implements a bootstrap phase according to an exemplary aspect of the subject innovation.

FIG. 4 illustrates a system 400 that includes a ring formation component 402 that implements a bootstrap phase 412 according to a particular aspect of the subject innovation. Such bootstrap phase 412 can be associated with beginning of a seed node's life cycle, to ensure that at any given time only one ring exists. Furthermore, during such bootstrap phase 412, if an existing ring is found, the seed node can join the existing ring the same manner a non-seed node does. Otherwise, such phase attempts to elect a seed node to be the super-seed node. A new ring can then form with the new super-seed node as the first node. Moreover, to ensure that only one ring is present in the system the following conditions are imposed:

1a) During bootstrap phase only one seed node is selected to be the super-seed node.
1b) A super-seed node can only be elected by a quorum of seed nodes.
1c) A super-seed node can form a new ring only after it ensures that the global tickets from all the seed nodes in the quorum have expired.

Likewise, after a bootstrap phase a node must terminate itself and rejoin the ring if it loses quorum of global leases. Accordingly, at any given point of time only one ring can exist in the system. For example, in the first bootstrap phase, there exists no prior ring—hence, election of merely one super-seed node can guarantee the existence of a single ring (constraint 1a above). As another example, when considering subsequent bootstrap phases, a new ring can only come into existence after the election of a super-seed node, as it is the first node to join the ring. Moreover, a super-seed node can only be elected by a quorum of seed nodes (constraint 1b). If a quorum of seed nodes has elected the super-seed node, such indicates that the quorum has left the previous ring. Before the super-seed node creates a new ring, one can ensure that time G has passed since the quorum of seed nodes issued their last global tickets. Additionally, such can further ensure that the previous instance of the ring is dead, hence indicating presence of at most one ring.

Bootstrap Phase

Figure 5:
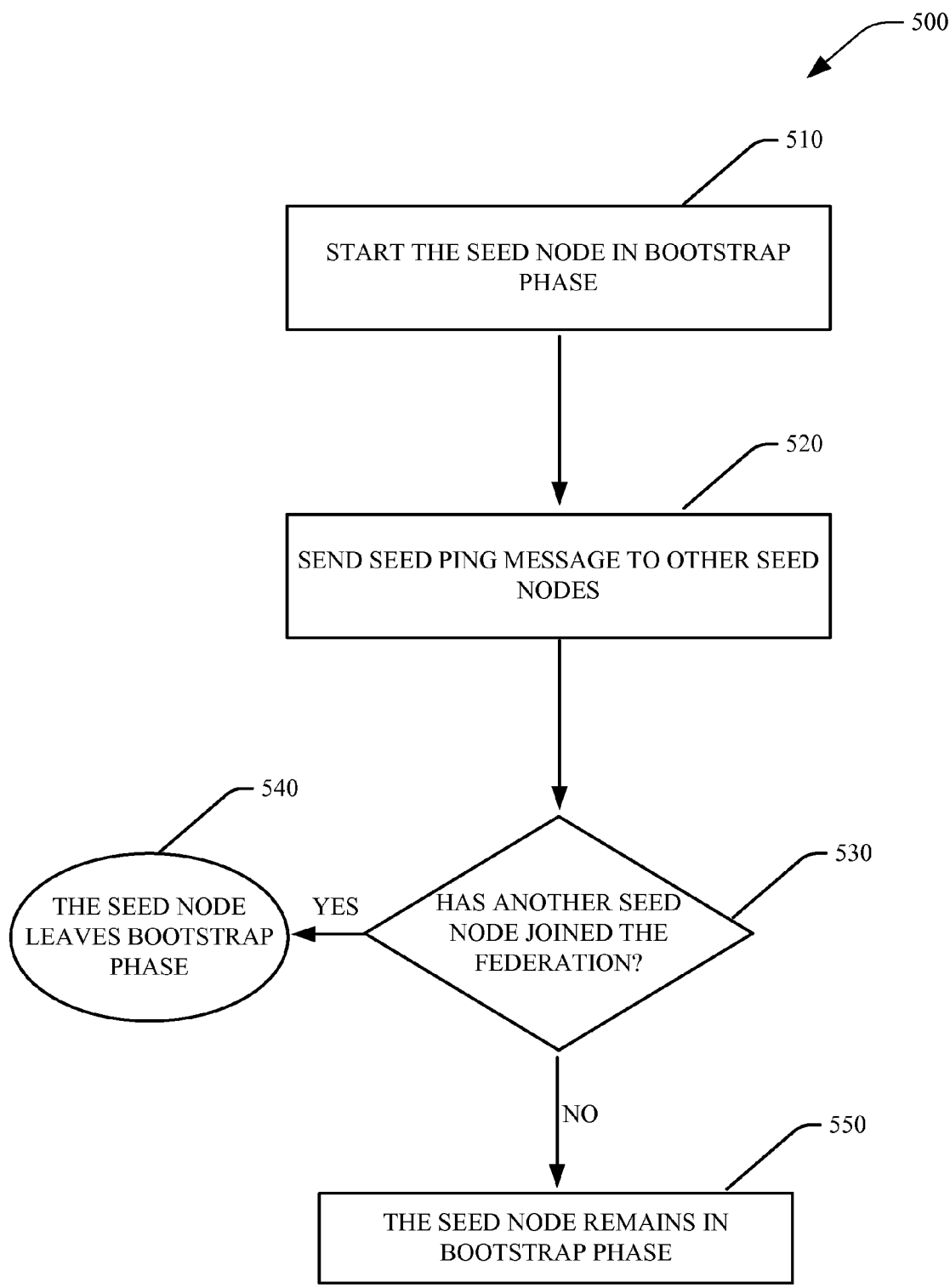
FIG. 5 illustrates an exemplary bootstrap phase according to an aspect of the subject innovation.
Figure 6:
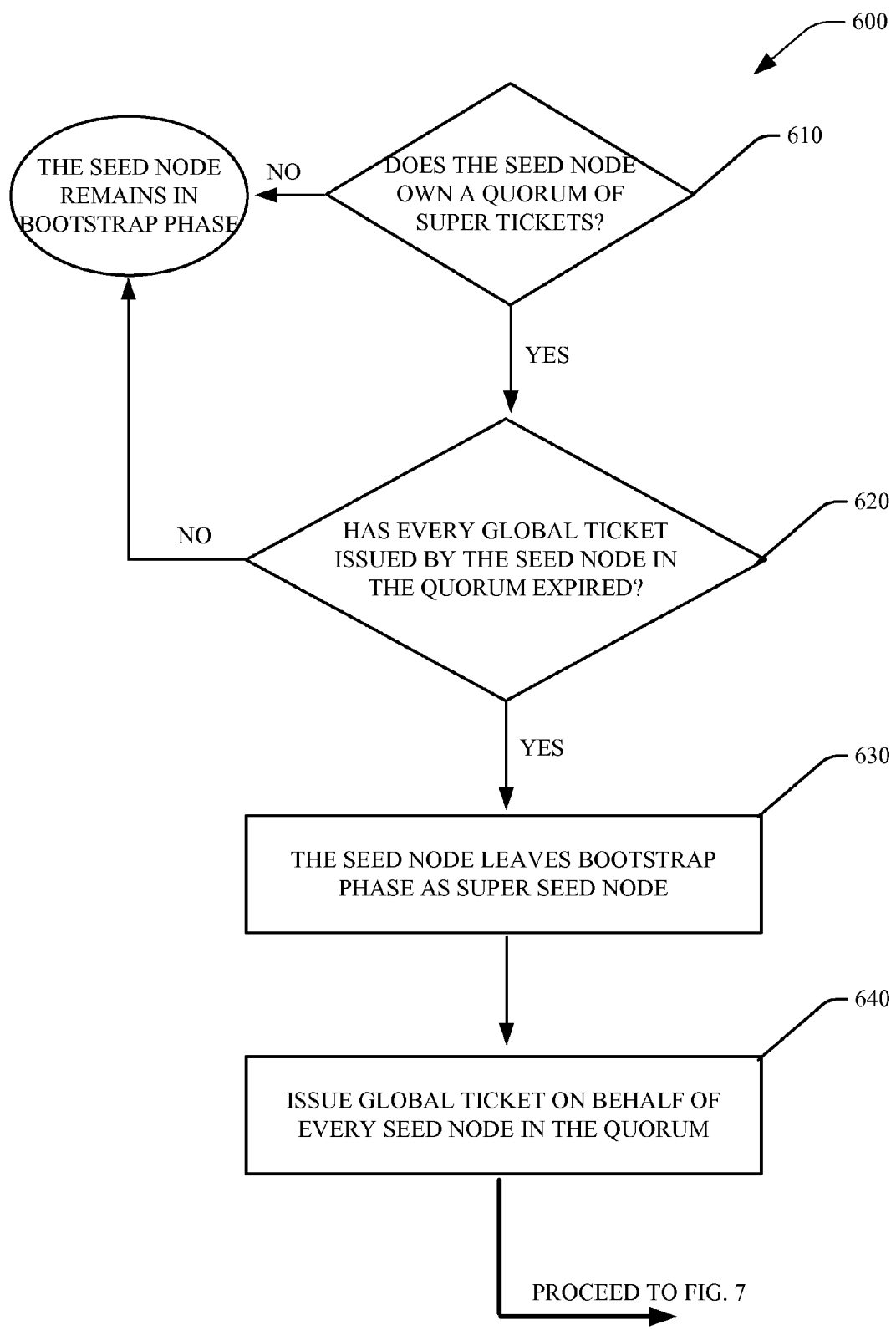
FIG. 6 illustrates a methodology of ticket exchange in a quorum according to a further aspect.

FIG. 5 illustrates an exemplary methodology 500 that facilitates enforcing the constraints detailed above. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described. In general, a seed node can always start in the bootstrap phase. During such phase and at 510, it keeps track of the status of other seed nodes by periodically sending SEEDPING messages to every other seed node, at 520. Every seed node will respond with a SEEDPINGRESPONSE message conveying its current phase. If a seed node notices that another seed node is already joined in the federation as determined at 530, it will merely leave the bootstrap phase at 540 and can enter a join phase, where it will send JOIN message as part of a message exchange for joining a ring. Otherwise and at 550 the seed node remains in the bootstrap phase.

In general, every seed node also keeps track of the super tickets it owns. Typically when a super seed enters the bootstrap phase, it will own its own super ticket—(an exception being when a seed node issues a super ticket to other seed node and then reboots before the super ticket expires, wherein after a restart no longer owns any super ticket because its super ticket has been granted to other seed nodes. It will own the super ticket again after the previously issued ticket is expired.) Moreover, super tickets can be transferred. When a node receives a SEEDPING message, if it is in bootstrap phase, and the sender's node id is smaller than its own node id, it will transfer all the super tickets it owns (If any) in the SEEDPINGRESPONSE message that is replied to the sender. When a super ticket is transferred, the expiration time of the corresponding global ticket will also be transferred.

Figure 7:
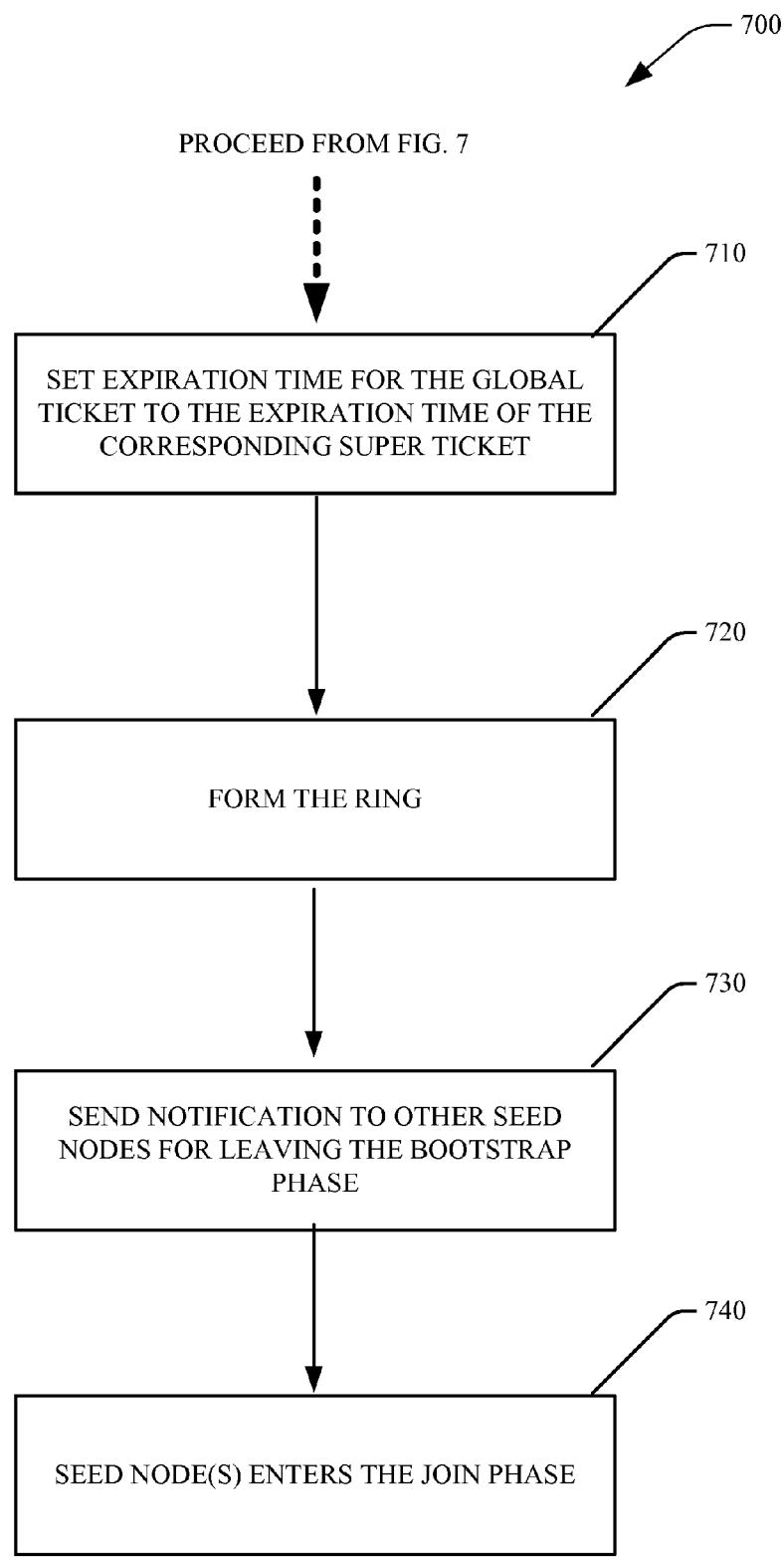
FIG. 7 illustrates a methodology of forming a ring according to a further aspect of the subject innovation.

Likewise, when a seed node determines at 610 that it owns (e.g., at least) a quorum of super tickets, and every global ticket issued by the seed nodes in the quorum have expired at 620, it can leave the bootstrap phase at 630 as a super seed node. It will also issue global tickets at 640 on behalf of every seed node in the quorum with the expiration time set to the expiration time of the corresponding super tickets, as illustrated in act 710 of methodology 700 for FIG. 7. It will subsequently form the ring at 720 and send a notification message to every other seed node so that they can leave the bootstrap phase at 730 and enter the join phase at 740.

Maintaining a Global Lease

According to a further aspect, a node is not required to have global lease in the bootstrap phase and the join phase. At the end of the join phase, the joining node will receive the global leases from the JOINRESPONSE message. From this point on, the node must terminate or kill itself if it ever loses quorum of global lease. Global leases are originally generated by the seed nodes and then transferred (directly or indirectly) to other nodes. It is to be appreciated that a seed node that issued an active super ticket loses its authority to issue global ticket. However, there exists an exception, wherein if a seed node notices receipt of a global ticket that is fresher than the latest global ticket issued by itself, and that global ticket is also fresher than the issue time of its last super ticket (but before the super ticket expires)—the seed node can conclude that its super ticket must be consumed by a super seed and the super seed must have granted global ticket on its behalf. In such case, the seed node can ignore the super ticket it issued and grant global tickets as if the super ticket is already expired. Without this optimization, there is guaranteed to exist a substantially small time window where no valid global ticket for this seed node exists in the entire ring, and hence global lease loss is very likely.

The discussion below pertains to how global leases can be renewed on every node. Since global tickets are only issued by seed nodes, the tickets are required to reach every node in the federation. In one aspect, a brute force option can be enforced to have each node maintain a lease with every seed node. According to a further aspect leases can be piggybacked on the existing messages. Such messages can include:

1. The lease messages exchanged between neighboring nodes for failure detection.
2. The UPDATE/UPDATERESPONSE message that the node has to send to update its routing table.

Moreover, the response messages can contain the ticket being transferred from one node to another. Each node can further maintain a table that contains the global ticket and use the messages to pass around their tickets.

Figure 8:
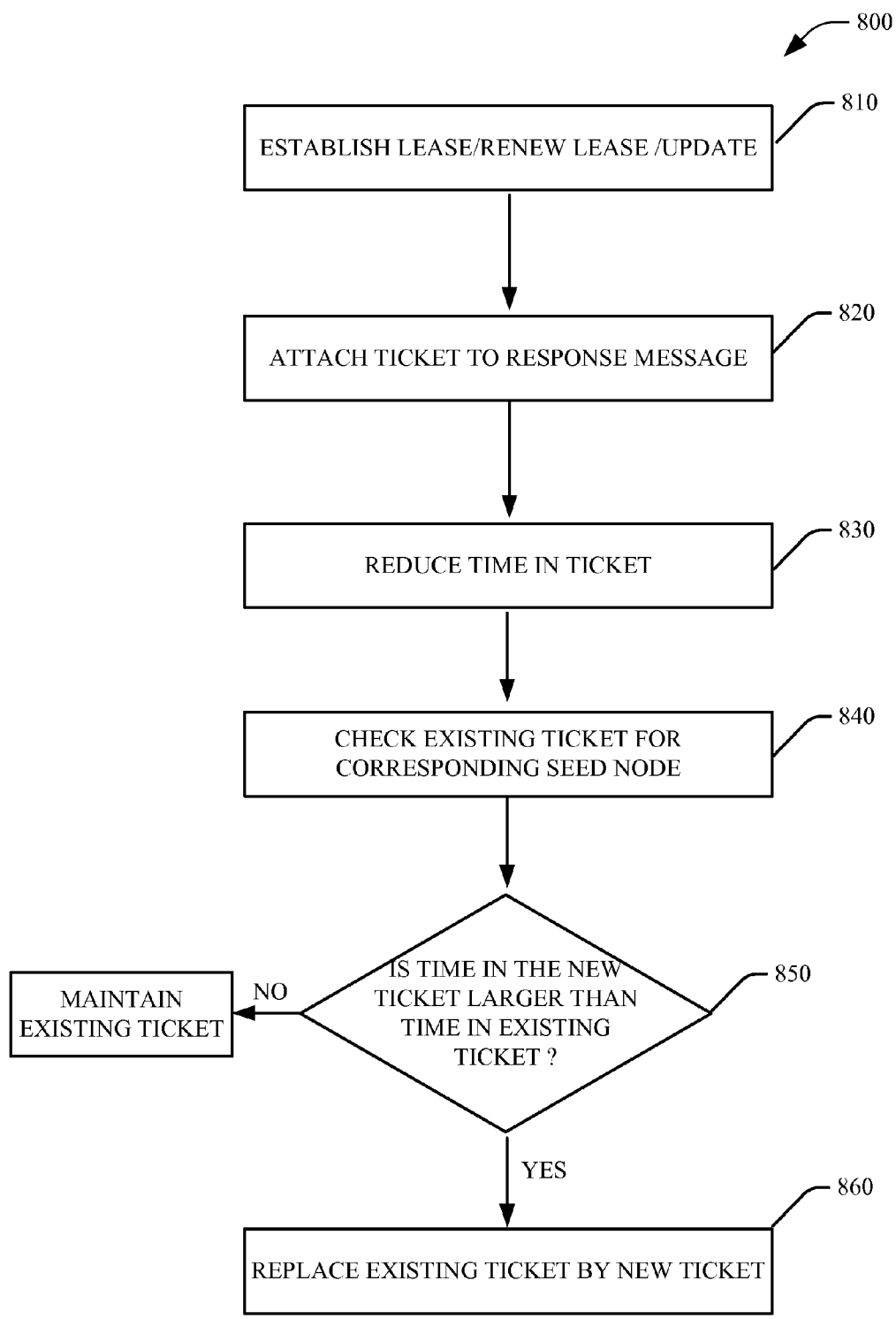
FIG. 8 illustrates a particular method of message exchange according to a further aspect.

FIG. 8 illustrates a particular methodology 800 of message exchange between nodes according to an aspect of the subject innovation. Initially and at 810 each of the ESTABLISH LEASE/RENEW LEASE/UPDATE messages can contain the time of send $T_{send}$. Subsequently, upon receiving an ESTABLISH LEASE/RENEW LEASE/UPDATE message and deciding to send a response (LEASERESPONSE/UPDATERESPONSE), the node can attach the tickets it has and the $T_{send}$ to the response message at 820. At 830 and upon receiving a ticket the node reduces the time in the ticket by $T_{current}-T_{send}$. Subsequently and at 840 the node can check the existing ticket for the corresponding seed node. Accordingly, if the time in the new ticket is larger than the time in the existing ticket then the existing ticket is replaced by the new ticket at 860.

In a related aspect, if a ticket is within $T_{GoToSeedNode}$ of its expiry, such node can attempt to obtain a new ticket from the seed node directly. Moreover, if at any ticket expiry the node finds out that a quorum of its tickets are expired, it would terminate or die and try to rejoin the ring.

Figure 9:
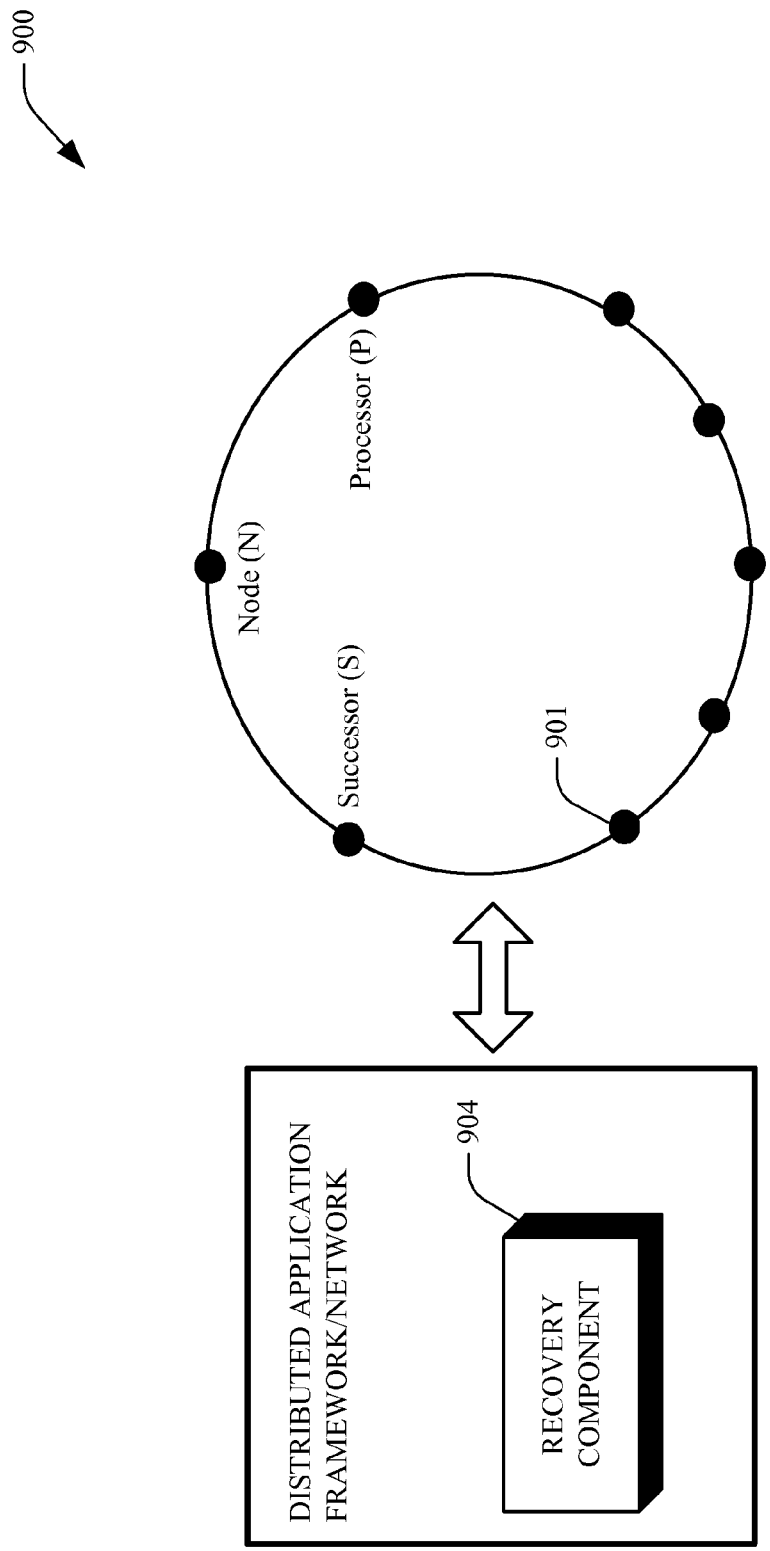
FIG. 9 illustrates a recovery component that can be employed in conjunction with an aspect of the subject innovation.

FIG. 9 illustrates a system 900 of distributed application framework that implements a recovery component 904 in accordance with an additional aspect of the subject innovation. The recovery component 904 can initiate the recovery protocol by a routing node. A probe message can be sent hop by hop until it reaches another routing node, which can then echo the probe message back hop by hop again until it reaches the originator. Moreover, every node on the path back can increment its recovery version to prevent itself from accepting a token that is transferred before it obtains the echo.

Under such system a node N claims ownership of the id range between its successor S and predecessor P nodes (where S, N, P are integers). The ownership range can be determined to be (N−(N−P)/2, N+(S−N)/2] using modulo arithmetic. Such can indicate that P, N, and S nodes have to be in agreement to guarantee only one node accepts the message sent to a target id, wherein such agreement implies ring consistency. It is to be appreciated that ring consistency alone is not sufficient to satisfy the safety property—e.g., since partitioned rings can be individually consistent, and yet violate the safety property. Various aspects of the subject innovation typically prevents ring partitions from developing from the very beginning.

Every node 901 maintains a sequence number for its token operations. The sequence number can be initialized to "0" and is increment for every token operation. The token operations are token creation, token splitting, token merger, and token recovery. All token transfer messages specify the target token sequence number at which the transferred token can be accepted by the receiving node. A receiving node cannot accept a transferred token if the specified target sequence number does not match its current token sequence number. For example, an initial seed node in a ring creates a valid token for the entire ID space and automatically becomes a routing node. Moreover, any other joining node attempts to acquire its token from an existing closest routing node as it owns the ID for the joining node. The joining node locates the closest node by routing a token request message to its own ID. When a routing node receives a token request from a non-routing node with an ID of x (x being am integer), it splits its valid token into two using the midpoint of its own ID and x as the partition point and transfers the token containing x to the joining node while retaining the other token.

Whenever a routing node finds a new successor or predecessor routing node with an ID of x, it checks to verify if its token contains ID space that is closer to the new node. If so, it splits its token into two using the midpoint of its own ID and x as the partition point and transfers the token containing x to the new node while retaining the other token. Every routing node can periodically talk to its immediate neighbor nodes so that it has infinite chances to perform such act.

In addition, when a routing node desires to leave the ring, it breaks its token into two parts using the midpoint of the predecessor and successor IDs as the partition point and transfers the two tokens to the predecessor and successor nodes respectively. Moreover, a node can accept an incoming token if it does not own a token and the incoming token range contains its own ID or its token is adjacent to the incoming one. If it cannot accept the token, it should reject it and, if possible, suggest a node that is known to be adjacent to the incoming token range. A routing node that has successfully obtained its token from both its successor and predecessor nodes is hence forth called an operating node. It is appreciated that an operating node is also a routing node and it remains an operating node until it reboots.

As used in this application, the terms "component", "system", are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Furthermore, all or portions of the subject innovation can be implemented as a system, method, apparatus, or article of manufacture using standard programming and/or engineering techniques to produce software, firmware, hardware or any combination thereof to control a computer to implement the disclosed innovation. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 10:
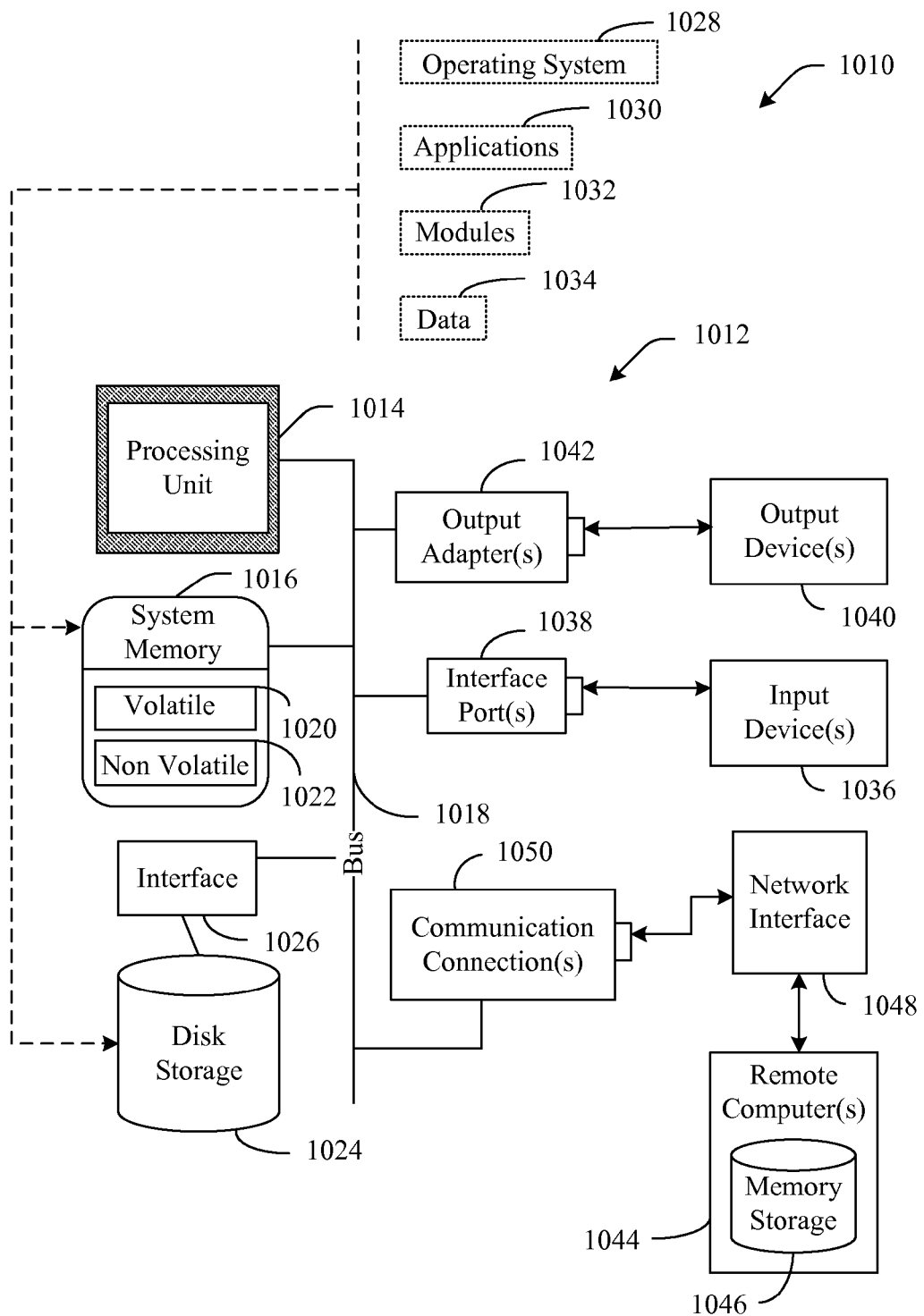
FIG. 10 illustrates an exemplary environment for implementing various aspects of the subject innovation.
Figure 11:
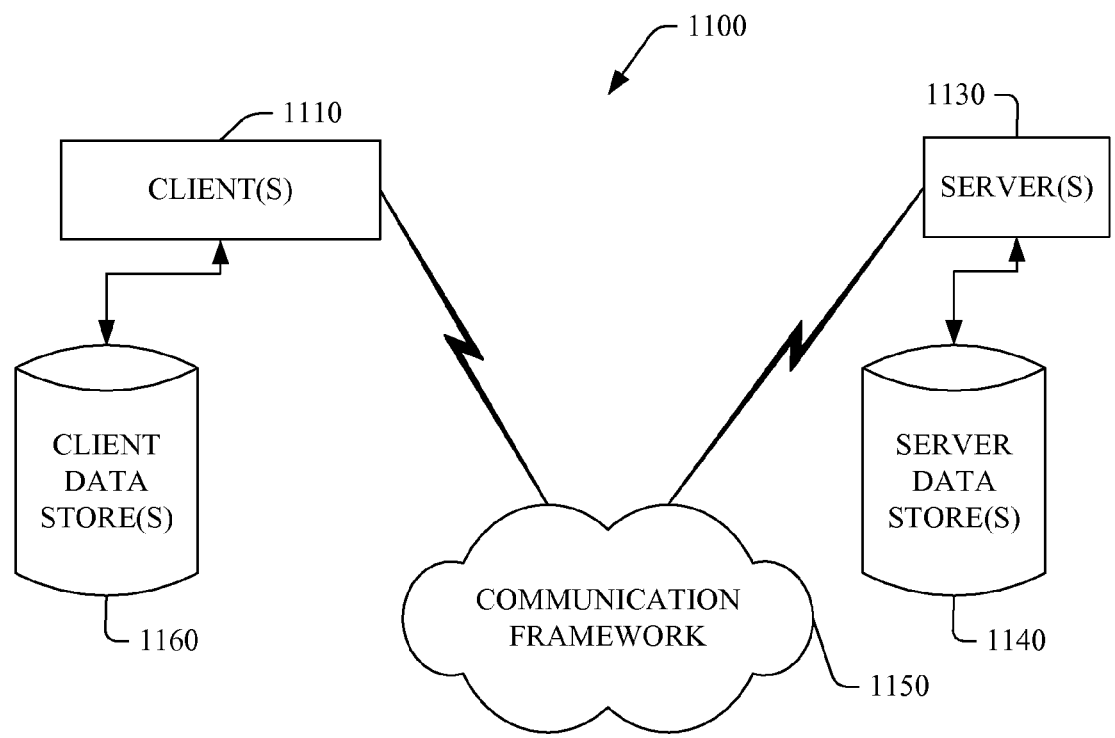
FIG. 11 is a schematic block diagram of a further exemplary computing environment that can be employed for a node formation according to an aspect of the subject innovation.

In order to provide a context for the various aspects of the disclosed subject matter, FIGS. 10 and 11 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the innovation also may be implemented in combination with other program modules. Generally, program modules include routines, programs, components, data structures, and the like, which perform particular tasks and/or implement particular abstract data types.

Moreover, those skilled in the art will appreciate that the innovative methods can be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the innovation can be practiced on stand-alone computers. In a distributed computing environment, program modules may be located in both local and remote memory storage devices.

With reference to FIG. 10, an exemplary environment 1010 for implementing various aspects of the subject innovation is described that includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. For example, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/non-removable, volatile/non-volatile computer storage media. FIG. 10 illustrates a disk storage 1024, wherein such disk storage 1024 includes, but is not limited to, devices like a magnetic disk drive, floppy disk drive, tape drive, Jaz drive, Zip drive, LS-60 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that various components described herein can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040 that require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

FIG. 11 is a schematic block diagram of a sample-computing environment 1100 that can be employed for implementing nodes as part of a federation, in accordance with an aspect of the subject innovation. The system 1100 includes one or more client(s) 1110. The client(s) 1110 can be hardware and/or software (e.g., threads, processes, computing devices).

The system 1100 also includes one or more server(s) 1130. The server(s) 1130 can also be hardware and/or software (e.g., threads, processes, computing devices). The servers 1130 can house threads to perform transformations by employing the components described herein, for example. One possible communication between a client 1110 and a server 1130 may be in the form of a data packet adapted to be transmitted between two or more computer processes. The system 1100 includes a communication framework 1150 that can be employed to facilitate communications between the client(s) 1110 and the server(s) 1130. The client(s) 1110 are operatively connected to one or more client data store(s) 1160 that can be employed to store information local to the client(s) 1110. Similarly, the server(s) 1130 are operatively connected to one or more server data store(s) 1140 that can be employed to store information local to the servers 1130.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims.

Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system for managing a bootstrap phase in a shared-trust federation for associating a plurality of computing devices, the plurality of computing devices including seed nodes and non-seed nodes, wherein the computing system comprises:
    a computing device configured as a first seed node of the plurality of computing devices and having a memory and a processor, wherein the computing device is configured to:
        receive a super ticket from at least one other seed node of the plurality of seed nodes, wherein each seed node of the plurality of seed nodes has a super ticket associated therewith;
        make a first determination, the first determination being a determination that the first seed node has received the super tickets associated with at least of quorum of the plurality of seed nodes;
        make a second determination, the second determination being a determination that any global tickets issued for any of the seed nodes have expired, wherein each global ticket indicates an authorization of a corresponding seed node for a node holding that global ticket to associate with the federation during a validity period of that global ticket; and
        in response to the first and second determinations, transmit to each of the other seed nodes, an instruction to leave the bootstrap phase such that exactly one association of nodes is formable at any one time.

2. The computer system of claim 1, wherein the computing device is further configured to:
    in response to the first and second determinations, issue new global tickets to one or more non-seed nodes on behalf of all seed nodes for which the first seed node holds a super ticket.

3. The computer system of claim 1, wherein the computing device is further configured to:
    receive a request for super tickets from a second seed node;
    determine whether the second seed node has higher priority than the first seed node; and
    if the second seed node has higher priority than the first seed node, transfer all super tickets held by the first seed node to the second seed node.

4. The computer system of claim 1, wherein the determination of whether the second seed node has higher priority than the first seed node is based on the respective values of node identifiers of the first seed node and the second seed node.

5. The computer system of claim 1, wherein the non-seed nodes are configured to associate with the shared-trust federation while holding non-expired global tickets issued on behalf of all of seed nodes from the plurality of seed nodes.

6. The computer system of claim 1, wherein the non-seed nodes are configured to associate with the shared-trust federation while holding non-expired global tickets issued on behalf of at least a quorum of seed nodes from the plurality of seed nodes.

7. The computer system of claim 6, wherein the non-seed nodes are configured to disassociate from the shared-trust federation if the non-seed node no longer holds non-expired global tickets issued on behalf of at least the quorum of seed nodes.

8. The computer system of claim 1, wherein the computing device is further configured to:
    issue global tickets only (1) while the first seed node holds the super ticket associated with the first seed node or (2) during a validity period of a super ticket associated with the first seed node and transferred by the first seed node to another seed node that remains after the first seed node has detected receipt of a global ticket that was issued after the last global ticket issued by the first seed node.

9. The computer system of claim 1, wherein each super ticket and global ticket is transferable between a sending node and a receiving node, and if transferred, the transferred ticket is recognized as expired by the receiving node before the transferred ticket is recognized as expired by the sending node.

10. The computer system of claim 1, wherein each super ticket represents permission, from the seed node associated with that super ticket, for the seed node holding that super ticket to issue global tickets on behalf of the associated seed node.

11. The computer system of claim 1, wherein each global ticket is either issued by the corresponding seed node or by another seed node on behalf of the corresponding seed node.

12. A computer implemented method of managing a bootstrap phase in for associating a plurality of computing devices, the plurality of computing devices including seed nodes and non-seed nodes, wherein the method comprises:

receiving, by a first seed node of a plurality of seed nodes, a super ticket from at least one other seed node of the plurality of seed nodes, wherein each seed node of the plurality of seed nodes has a super ticket associated therewith;

making, by the first seed node, a first determination, the first determination being a determination that the first seed node has received the super tickets associated with at least of quorum of the plurality of seed nodes;

making, by the first seed node, a second determination, the second determination being a determination that any global tickets issued for any of the seed nodes have expired, wherein each global ticket indicates an authorization of a corresponding seed node for a node holding that global ticket to associate with the seed nodes during a validity period of that global ticket; and in response to the first and second determinations, transmitting to each of the other seed nodes, an instruction to leave the bootstrap phase such that exactly one association of nodes is formable by the seed nodes at any one time.

13. The computer implemented method of claim 12, further comprising:

in response to the first and second determinations, determining that the first seed node is a super seed node.

14. The computer implemented method of claim 12, further comprising:

in response to the first and second determinations, issuing new global tickets to one or more non-seed nodes on behalf of all seed nodes for which the first seed node holds a super ticket.

15. The computer implemented method of claim 12, wherein the non-seed nodes are configured to associate with the shared-trust federation while holding non-expired global tickets issued on behalf of at least a quorum of seed nodes from the plurality of seed nodes, and wherein the non-seed nodes are configured disassociate from the shared-trust federation upon losing quorum of global tickets.

16. The computer implemented method of claim 12, wherein each global ticket is transferable between a sending node and a receiving node, and if transferred, the transferred global ticket is recognized as expired by the receiving node before the transferred ticket is recognized as expired by the sending node.

17. The computer implemented method of claim 12, wherein each super ticket represents permission, from seed node associated with that super ticket, for the seed node holding that super ticket to issue global tickets on behalf of the associated seed node, and wherein each global ticket is either issued by the corresponding seed node or by another seed node on behalf of the corresponding seed node.

18. A computer-readable storage memory having instructions stored thereon for causing a first computing device to execute operations for managing a bootstrap phase for associating a plurality of computing devices, the plurality of computing devices including seed nodes and non-seed nodes, wherein the operations comprises:

receiving, by a first seed node of a plurality of seed nodes, a super ticket from at least one other seed node of the plurality of seed nodes, wherein each seed node of the plurality of seed nodes has a super ticket associated therewith;

making, by the first seed node, a first determination, the first determination being a determination that the first seed node has received the super tickets associated with at least of quorum of the plurality of seed nodes;

making, by the first seed node, a second determination, the second determination being a determination that any global tickets issued for any of the seed nodes have expired, wherein each global ticket indicates an authorization of a corresponding seed node for a node holding that global ticket to associate with the federation during a validity period of that global ticket; and in response to the first and second determinations:
  transmitting to each of the other seed nodes, an instruction to leave the bootstrap phase such that exactly one association of nodes is formable at any one time.

19. The computer-readable storage memory of claim 18, wherein each super ticket represents permission from the associated seed node for the seed node holding that super ticket to issue global tickets on behalf of the associated seed node, and wherein each global ticket is either issued by the corresponding seed node or by another seed node on behalf of the corresponding seed node.

20. The computer-readable storage memory of claim 18, wherein each super ticket is transferable between a sending node and a receiving node, and if transferred, the transferred super ticket is recognized as expired by the receiving node before the transferred ticket is recognized as expired by the sending node, and wherein the operations executed in response to the first and second determinations further comprise:

issuing new global tickets to one or more non-seed nodes on behalf of all seed nodes for which the first seed node holds a super ticket.

* * * * *